United States Patent

Soldati et al.

(10) Patent No.: US 9,998,986 B2
(45) Date of Patent: Jun. 12, 2018

(54) METHOD FOR TRANSMITTING COMMUNICATION SIGNALS IN A WIRELESS COMMUNICATION SYSTEM

(71) Applicant: Huawei Technologies Co., Ltd., Shenzhen (CN)

(72) Inventors: Pablo Soldati, Kista (SE); Branislav Popovic, Kista (SE)

(73) Assignee: Huawei Technologies Co., Ltd, Shenzhen (CN)

( * ) Notice: Subject to any disclaimer, the term of this patent is extended or adjusted under 35 U.S.C. 154(b) by 128 days.

(21) Appl. No.: 14/997,170

(22) Filed: Jan. 15, 2016

(65) Prior Publication Data

US 2016/0135123 A1    May 12, 2016

Related U.S. Application Data

(63) Continuation of application No. PCT/EP2013/064935, filed on Jul. 15, 2013.

(51) Int. Cl.
*H04W 52/02*    (2009.01)

(52) U.S. Cl.
CPC ... *H04W 52/0206* (2013.01); *H04W 52/0229* (2013.01); *H04W 76/28* (2018.02);
(Continued)

(58) Field of Classification Search
CPC ............ H04B 1/1615; H04W 52/0216; H04W 60/02; H04W 56/00; H04W 56/0015;
(Continued)

(56) References Cited

U.S. PATENT DOCUMENTS 5,758,278 A * 5/1998 Lansdowne ......... H04W 52/029
455/343.3
2005/0266896 A1* 12/2005 Son ...................... H04B 1/1615
455/574
(Continued)

OTHER PUBLICATIONS

Qualcomm Incorporated: "Mechanisms for Efficient Small Cell Operation," 3GPP TSG-RAN WG1 #72, R1-130595, Jan. 28-Feb. 1, 2013, 3 pages, St. Julian, Malta.
(Continued)

*Primary Examiner* — Jung Liu
(74) *Attorney, Agent, or Firm* — Slater Matsil, LLP

(57) ABSTRACT

Embodiments relate to a method in a first network node for transmitting communication signals in a wireless communication system, the first network node being arranged to operate in an active mode in which the first network node has full transmission and/or reception capabilities or in an idle mode in which the first network node has limited transmission and/or reception capabilities in relation to the active mode; the method being characterized by the steps of: encoding an indication of time left in idle mode for the first network node into a communication signal; and transmitting said communication signal in the wireless communication system while operating in the idle mode. Furthermore, embodiments also relate to a corresponding method in a second network node, a first network node device, a second network node device, a computer program, and a computer program product thereof.

19 Claims, 5 Drawing Sheets

(52) U.S. Cl.
CPC .......... *Y02D 70/00* (2018.01); *Y02D 70/1262* (2018.01); *Y02D 70/21* (2018.01); *Y02D 70/24* (2018.01); *Y02D 70/25* (2018.01)

(58) Field of Classification Search
CPC ............. H04W 72/0453; H04W 88/02; H04W 52/0235; Y02B 60/50; H04L 7/042; H04L 5/0092; H04L 5/0053; H04L 27/2613; H04L 5/0007; H04L 12/12; H04J 3/0682; H04J 13/0062
See application file for complete search history.

(56) References Cited

U.S. PATENT DOCUMENTS

| | | | | |
|---|---|---|---|---|
| 2006/0274711 | A1* | 12/2006 | Nelson | H04W 56/0085 370/342 |
| 2008/0181127 | A1* | 7/2008 | Terry | H04W 52/0212 370/252 |
| 2009/0232118 | A1* | 9/2009 | Wang | H04L 5/0091 370/338 |
| 2010/0232308 | A1* | 9/2010 | Yamazaki | H04W 56/0005 370/252 |
| 2011/0038387 | A1* | 2/2011 | Han | H04L 5/0007 370/480 |
| 2011/0134867 | A1* | 6/2011 | Lee | H04L 5/0023 370/329 |
| 2011/0280221 | A1* | 11/2011 | Chin | H04W 76/048 370/335 |
| 2012/0236977 | A1* | 9/2012 | Zou | H04W 56/0015 375/354 |
| 2013/0308533 | A1* | 11/2013 | Murakami | H04W 76/048 370/328 |
| 2014/0301263 | A1* | 10/2014 | Ji | H04W 52/0216 370/311 |
| 2015/0016317 | A1* | 1/2015 | Park | H04W 52/146 370/280 |

OTHER PUBLICATIONS

"3rd Generation Partnership Project; Technical Specification Group Radio Access Network; Evolved Universal Terrestrial Radio Access (E-UTRA); Requirements for Support of Radio Resource Management (Release 11)," 3GPP TS 36.133, V11.1.0, Jun. 2012, 652 pages.

Ashraf et al.,: "SLEEP Mode Techniques for Small Cell Deployments," IEE Communications Magazine, Aug. 2011, 8 pages, vol. 49, No. 8.

Auer et al.: "Energy Efficiency Analysis of the Reference Systems, Areas of Improvement and Target Breakdown," Energy Aware Radio and Network Technologies, INFSO-ICT-247733 Earth, Dec. 31, 2010, 68 pages.

Falconetti et al. "Energy Efficiency in Heterogeneous Networks," 2012 IEEE Online Conference on Green communications (GreenCom), Sep. 25-28, 2012, pp. 98-103, Piscataway, NJ.

Huawei et al.: "New Study Item Proposal for Small Cell Enhancements for E-UTRA and E-UTRAN- Physical-Layer Aspect," 3GPP TSG-RAN Meeting #58, RP-122032, Dec. 4-7, 2012, 10 pages, Barcelona, Spain, 10 pages.

* cited by examiner

METHOD FOR TRANSMITTING COMMUNICATION SIGNALS IN A WIRELESS COMMUNICATION SYSTEM

This application is a continuation of International Application No. PCT/EP2013/064935, filed on Jul. 15, 2013, which is hereby incorporated by reference in its entirety.

TECHNICAL FIELD

The present invention relates to a method in a first network node for transmitting a communication signal in a wireless communication system. Furthermore, the invention also relates to a corresponding method in a second network node, a first network node device, a second network node device, a computer program, and a computer program product thereof.

BACKGROUND OF THE INVENTION

A massive densification of radio access nodes has been argued as a potential solution to meet the spectral efficiency requirements expected in future radio access networks. However, a recent study has showed that a plain network densification would significantly increase the overall energy costs. Therefore, future generations of dense radio access networks should be co-designed to be both spectral- and energy-efficient.

A new design feature that promises to fulfil these requirements is an adaptive on/off duty-cycling of radio access nodes to traffic or other relevant network statistics. Future releases of the related art 3GPP Long Term Evolution (LTE) system may adopt this feature for heterogeneous networks where a large number of small cells (i.e., cells with a small coverage area), deployed within the coverage area of a macro-cell, are switched on to offload the macro-cell when the latter is overloaded, whilst they are switched off or transit in a low-power (dormant) state otherwise.

The European project EARTH has analyzed the energy efficiency of a reference network comprising state-of-the-art macro, pico, micro, and femto/home base stations, showing that a truly energy efficient utilization of such nodes in a dense deployment requires to fully de-activate the baseband processing and the radio hardware. Hence, rather than completely switching off a radio access node, an alternative solution is to introduce discontinuous transmission/reception (DTX/DRX) at the network side, i.e., to put the radio access nodes in an idle (low-energy consumption) mode with limited transmission/reception capabilities whenever suitable. The EARTH project has further observed that in average a cell is actively transmitting user data about 5% of the subframes. This number may be significantly lower in ultra dense networks, e.g., 1% or less. An idle mode DTX ratio of 1% implies that for a transmission time in the order of tens/hundreds of milliseconds (e.g., 100 ms) the idle time would be in the order of tens of seconds (e.g., 10 s), depending on traffic statistics, user migration etc.

One problem with introducing long sleeping cycles followed by very short activation time of radio access nodes is that the traditional cell discovery procedures become inefficient. For instance, the cell search procedure in the related art LTE system is designed assuming that base stations (eNodeB) are constantly active and consists of a series of synchronization steps upon which a mobile station (User Equipment, UE) acquires time and frequency synchronization and other crucial system parameters that are necessary to demodulate other downlink signals.

The LTE cell-search exploits two specially designed signals: the Primary Synchronization Signal (PSS) and the Secondary Synchronization Signal (SSS). The particular design of these signals allows a UE to acquire the correct time-frequency synchronization (including subframe boundaries), as well as the physical identity of the cell, the cyclic prefix length, and whether the cell operates in Time Division Duplex (TDD) or Frequency Division Duplex (FDD).

The PSS/SSS synchronization signals are transmitted twice per 10 ms radio frame for both TDD and FDD cases, although with slightly different time structure. A cyclic prefix is added to both PSS and SSS and the length of the synchronization signals are blindly detected. While the PSS is the same in both transmissions within a radio frame, the SSS can change within a radio frame in a specific manner to enable the UE to detect the position of the 10 ms radio frame boundary. In the frequency domain, the PSS/SSS are mapped to subcarriers within the six central resource blocks, thus being invariant to the system bandwidth and enabling the UE to synchronize to the network without prior knowledge of the exact system bandwidth. The PSS and SSS signals consist of a length-62 symbol Zadoff-Chu sequence mapped to the central 62 subcarriers around the d.c. subcarrier (which is left unused). The two sequences used for PSS and SSS in a given cell are specially designed to reveal the physical layer cell identity to the mobile station. In particular, in LTE there are 504 physical cell identities grouped into 168 groups of three identities (typically assigned to three cells under the control of the same eNodeB). Three PSS sequences are used to indicate one cell identity within a group, while the 168 SSS sequences are used to identify a group.

The PSS and SSS are always transmitted from the same antenna port in any given subframe, while between different subframes they may be transmitted from different antenna ports in case the eNodeB uses multiple antennas. The requirements for cell detection combine a minimum SINR condition with a maximum allowed detection time, e.g., (−6 dB, 800 ms) for intra-frequency with a measurement period of 200 ms.

Dynamic on/off switching of network cells has been considered as potential technique for interference mitigation in dense deployments of small cells in the related art LTE system. One approach is to enable base stations to transit into an idle mode with limited transmission/reception capabilities, hence with low-energy consumption, followed by a very short active time for transmission/reception.

The current cell detection supporting the network access procedure in the related art LTE system is designed for a sparsely deployed system of macro-cells always active. The procedure comprises a first detection step based on synchronization signals (PSS/SSS) and a second step based on Common Reference Signals (CRS) used to verify the cell ID and perform initial Reference Signal Received Power (RSRP) measurements. The requirements for cell detection, listed in Table 1, combine a minimum Signal-to-Interference and Noise Ratio (SINR) condition with a maximum allowed detection time, e.g., (−6 dB, 800 ms) for intra-frequency with a measurement period of 200 ms. The measurement sampling is implementation specific, but typical values range in 1-2 ms sample/snapshot per 40 ms or per DRX cycle.

TABLE 1

| LTE cell detection requirements in RRC_CONNECT state | | |
|---|---|---|
| | E-UTRAN intra-frequency | E-UTRAN inter-frequency |
| Received signal quality | CRS: Es/IoT ≥ −6 dB<br>PSS/SSS: Es/IoT ≥ −6 dB | CRS: Es/IoT ≥ −4 dB<br>PSS/SSS: Es/IoT ≥ −4 dB |
| Measured cells | Up to 7 cells | Up to 3 inter-frequencies and up to 4 cells per frequency |
| Time requirements | Detection time: 800 ms<br>Measurement period: 200 ms | Detection time: $(3.84\ s,\ 7.68\ s) \cdot N_{freq}$<br>Measurement period: $480\ ms \cdot N_{freq}$ |

In a dense synchronized network, the number of small cells detected by a UE with a legacy LTE cell-search is limited by the interference: a) the PSS/SSS from different cells occupy the same time-frequency resources, hence the PSS/SSS of one cell in a dense deployment is likely to collide and interfere with other PSS/SSS (due to the small radius of the cells). As only 3 PSS sequences are used in LTE, the coherent detection of PSS/SSS is degraded by these collisions; b) the maximum time difference of different PSS/SSS signals is seldom larger than one cyclic prefix; c) the time period available for combining multiple samples is reduced due to the limited coverage of small cells. Therefore, the legacy LTE cell search is not sufficiently robust in a dense network deployment. Furthermore, depending on the SINR at the receiver, the detection time can take several hundreds of milliseconds (ms). Hence, when base station operate with a long sleeping duty-cycle followed by a short activation time of a few hundreds of ms, the legacy LTE cell-search would not have sufficient time to correctly detect the cell signals and to perform measurements.

A straightforward way to improve the performance of the legacy cell-search is to relax SINR requirements and use legacy synchronization signals for RRC_CONNECETD UEs with reduced number of samples. This, however, requires longer cell-search and only circumvents the problem without actually solving it.

Another approach is to consider network-assisted synchronization, i.e., to assume that the UE knows which particular subframes are used for transmission of detection signals. This, however, requires the UE to be aware of the resources configured for detection signals.

Another method is to reduce the density of the synchronization and reference signals, and hence reduce the inter-cell interference on PSS/SSS when a large number of cells is deployed in a small geographical area. For instance, a network-assisted mechanism can be used to time multiplex the transmission of PSS/SSS/CRS and MIB/system information (SI) from different cells in N milliseconds (ms) bursts every M ms with L ms offset compared to a serving cell, with N, M, L configured by the active serving cell. A drawback of this method is that implies a serving (macro) cell supposedly active at all times.

A different approach is to design new discovery signals for a mobile node in RRC_CONNECTED state. One method is to use synchronized transmission of discovery signals among cells in order to reduce the discovery time and enhance UE energy efficiency. To this end, two possible reference signals have been proposed for the LTE system: channel-state information reference signals (CSI-RS); and Positioning Reference Signals (PRS). With the former, each small cell within a cluster would transmit a CSI-RS of a different configuration pattern while muting the CSI-RS resources for all other configuration patterns, thereby enabling fully orthogonal discovery RS within a cluster. In the latter case, a small cell would transmit the PRS with sub-carrier shifts of reuse factor 6 according to the physical cell ID (PCI). In either case, the mobile station needs to know a priori the carrier, bandwidth, and time where these signals are transmitted for each cell.

Other methods to improve the energy efficiency of the cell discovery in case of dynamic on/off switching of base stations is to use uplink signals transmitted by the UE to trigger the downlink transmission of discovery signals from neighbouring base stations in idle state. This, however, requires new uplink signals to be designed, as well as a new handover mechanism between access nodes based on signal strength measurements carried out by and exchanged across multiple the access nodes, rather than multiple reports from a mobile station to a serving cell. Furthermore, when the UE is in RRC_CONNECT state, i.e., connected to a serving cell, new criteria should be identified for self-triggering the transmission of such uplink discovery signals.

As been discussed above, with the introduction of the idle mode capabilities, some or all the signals that are typically transmitted to aid the mobile station to detect a network node, synchronize to, and access the network may either be absent or transmitted only sporadically. Detecting the presence of a dormant cell may therefore require longer time, thereby draining the battery of the mobile station. On the other hand, the prior art procedures are not sufficiently fast to enable a mobile station to quickly connect to a dormant cell when it switches to an active mode for a short time period.

Moreover, in a radio access network with a dense deployment of radio access nodes, conventional cell detection procedures based on synchronization signals become ineffective due to the inter-cell interference. When radio access nodes are further enabled to transit into an idle mode with limited transmission/reception capabilities and are active only for a short time (e.g., 1% active duty cycling), an additional issue is to assure fast cell detection prior a network node is turned off again.

A further related issue is the energy efficiency of the cell-search procedure at the mobile node, as a mobile station failing to detect a cell in its active time may need to extend the cell search until the cell reactivates.

SUMMARY

An objective is to provide a solution which mitigates or solves the drawbacks and problems of prior art solutions.

Another objective is to provide a solution which improves the search procedures when searching for network nodes operating in idle mode.

According to a first aspect, the above mentioned objectives are achieved by a method in a first network node for transmitting communication signals in a wireless communication system, the first network node being arranged to operate in an active mode in which the first network node has full transmission and/or reception capabilities or in an idle mode in which the first network node has limited transmission and/or reception capabilities in relation to the active mode. The method includes the steps of: encoding an indication of time left in idle mode for the first network node into a communication signal; and transmitting said communication signal in the wireless communication system while operating in the idle mode.

According to a second aspect, the above mentioned objectives are achieved by a method in a second network node for receiving communication signals in a wireless communication system. The method includes the steps of: receiving a communication signal from a first network node; and decoding said communication signal so as to obtain an indication of time left in idle mode for the first network node.

Different embodiments of the above methods are defined in the appended dependent claims.

Furthermore, the present method may be comprised in a computer program which when run by processing means causes the processing means to execute the present method. A computer program product may comprise the computer program and a computer readable medium.

According to a third aspect, the above mentioned objectives are achieved with a first network node device arranged to transmit communication signals in a wireless communication system, the first network node device further being arranged to operate in an active mode in which the first network node device has full transmission and/or reception capabilities or in an idle mode in which the first network node device has limited transmission and/or reception capabilities in relation to the active mode. The device further comprises: an encoding unit arranged for encoding an indication of time left in idle mode for the first network node into a communication signal; and a transmitter arranged for transmitting said communication signal in the wireless communication system while operating in the idle mode.

According to a fourth aspect, the above mentioned objectives are achieved with a second network node device arranged to receive communication signals in a wireless communication system. The device further comprises: a receiver arranged for receiving a communication signal from a first network node device; and a decoder arranged for decoding said communication signal so as to obtain an indication of time left in idle mode for the first network node device.

The first and second network node devices can be modified, mutatis mutandis, according to any method of the embodiments.

The embodiments provide a solution for indicating the presence of a first network node in idle mode and further for indicating the time left in idle mode for the first network node to a second network node with the use of only one communication signal. Thereby, the search procedure is improved when searching for first network nodes in idle mode resulting in better energy use for the second network node.

Especially, the embodiments provide a solution which enable robust and fast detection of a large number of network nodes in a dense network deployment where network nodes may transit into an idle mode with limited transmission/reception capabilities followed by a short active transmission time.

Further applications and advantages of the embodiments will be apparent from the following detailed description.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

In the following disclosure, the terminology from the 3GPP LTE system is occasionally used, but the skilled person may interchangeably consider more general notations of channels, signals, etc. with the same functionalities and properties. Furthermore, the terms radio access node, network node, base station, and cell are used interchangeably in this disclosure.

A radio access system where a group of first network nodes can transit into an idle mode (e.g., a dormant mode) with reduced transmission/reception capabilities or to be completely switched off for a period of time, followed by an active period of time, is considered. Hence, the first network nodes are arranged to operate in at least two different modes, an active mode in which the first network node has full transmission and/or reception capabilities or in an idle mode in which the first network node has limited transmission and/or reception capabilities in relation to the active mode. The transmission and/or reception capabilities relates to the ability of transmitting/receiving of user data and/or control data for a certain operating mode. For instance, a network node may be adapted to disable the transmission of user data and/or control data for a period of time, whilst being able to receive user data and/or control data, or vice versa.

Figure 1:
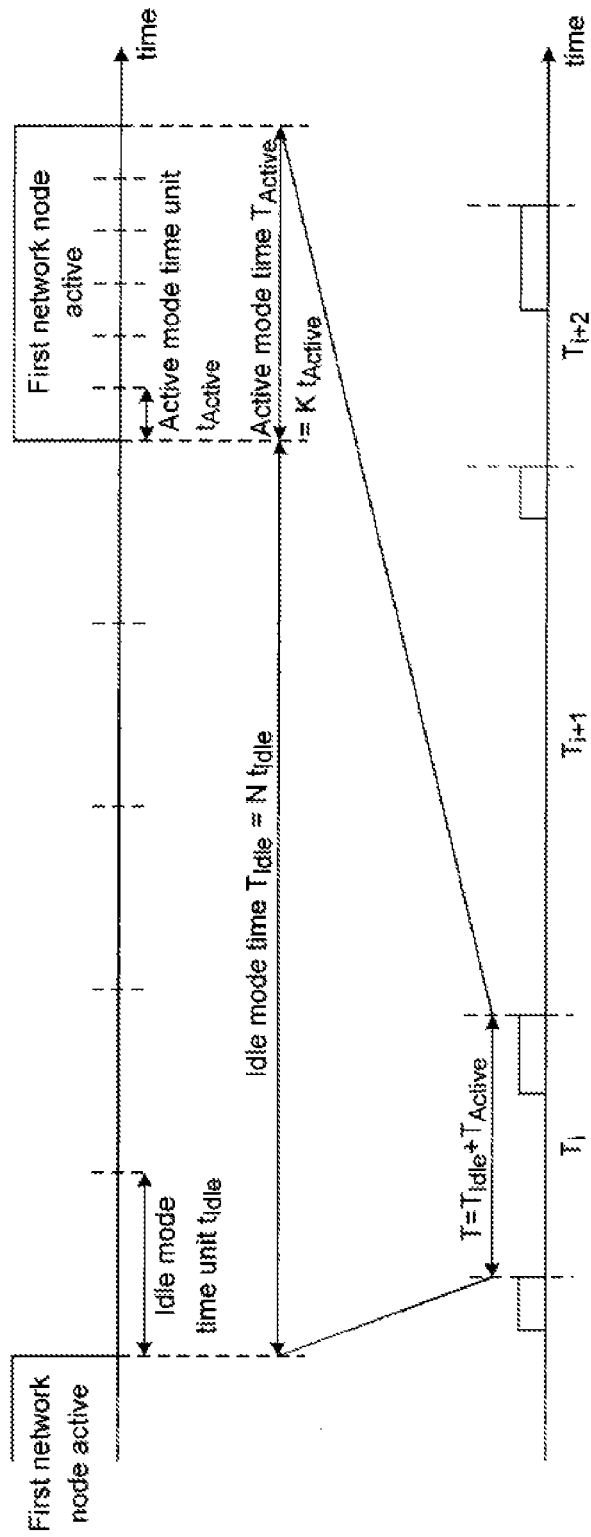
FIG. 1 shows a representation of a cell duty cycle with an idle mode time duration and an active mode time duration.

FIG. 1 is a representation of the network node duty-cycling, where the idle mode time duration $T_{Idle}$ is divided into a number N of equally sized idle mode time units of duration $t_{Idle}$, while the active mode time duration $T_{Active}$ is divided into a number K of active mode time units of duration $t_{Active}$. Both the idle and active time units can be expressed in terms of the physical time units used in the communication system, such as time slot, subframe, radio frame, etc in the related art LTE system, or groups thereof. The duration of the idle and active modes ($T_{Idle}$ and $T_{Active}$, respectively) and hence the overall duty cycle $T=T_{Idle}+T_{Active}$, are not necessarily fixed and may be adapted from one duty-cycle to the next depending on the application.

Embodiments disclose a method for transmitting and receiving a communication signal that comprises an indication of the time left in idle mode for the first network node, i.e., the time left until the first network node transits into the active mode. Therefore, the communication signal has a twofold purpose: to indicate the presence of a first network node in idle mode to a second network node (receiver); and to signal an indication of time left in idle mode.

Generally, the present method in a first network node for transmission comprises the steps of encoding an indication of time left in idle mode for the first network node into a communication signal, and thereafter transmitting the (encoded) communication signal in a wireless communication system while the first network node operates in the idle mode. Further, the present method in a second network node for receiving the communication signal comprises the steps of receiving the communication signal, and thereafter decoding the communication signal so as to obtaining the indication of the time left in idle mode for the first network node.

Thereby, a first benefit of the embodiments is to aid and support the search procedure at the second network node by enabling the second network node to detect the presence of the first network node operating in the idle mode. The communication signal according to the embodiments has the further benefit of improving the energy efficiency of the search procedure at the second network node by indicating the time left in idle mode of the first network node, thereby enabling the second network node to suspend the search for the time left prior to the reactivation of the first network node.

The above advantages are even more apparent when the first network node is represented in the form of a cell as the cell-search procedure is made more efficient and having better performance. For example, the communication signal can aid the receiver to conclude the cell-search prior the cell is reactivated, thereby enabling more time to connect the receiver to the cell when the cell becomes active (for instance, when the mobile station is not yet connected to the network) or to support a fast handover (when the mobile station is already connected to the network through another cell). Compared to prior art, the present communication signal is particularly advantageous when the activation time of the cell is short compared to the time requirements for successfully completing the cell-search procedure.

Figure 2:
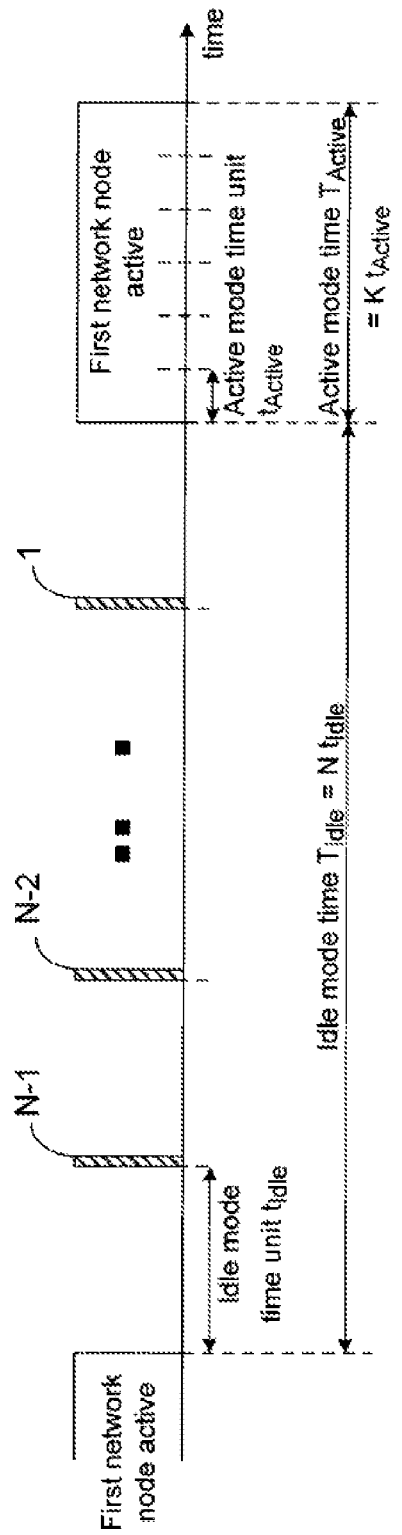
FIG. 2 illustrates the transmission of a signal transmitted while the first network node operates in the idle mode.

According to an embodiment the first network node transmits one communication signal in each idle mode time unit $t_{Idle,n}$, where n=1, 2, . . . , N, is a positive integer, encoding an indication of the idle mode time units left prior the reactivation of the first network node. FIG. 2 illustrates the transmission of the present communication signal by an idle first network node with an indication of the idle mode time units left. It is noted that the communication signal is transmitted in each idle mode time unit $t_{Idle,n}$, and in this particular embodiment the communicating signal indicates the idle mode time units left prior the reactivation of the first network node. In another exemplifying embodiment the signal indicates the index of the latest idle mode time unit.

Figure 4:
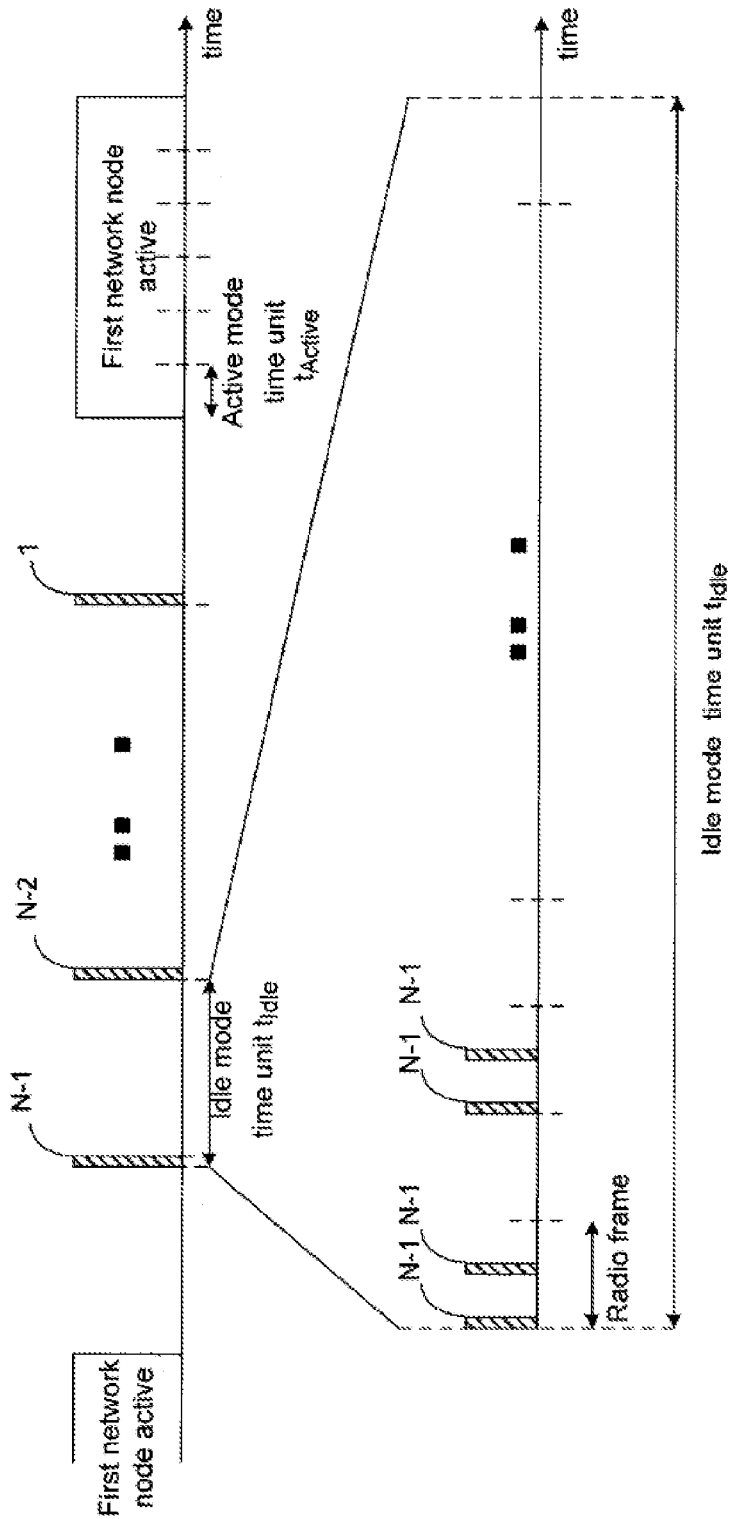
FIG. 4 illustrates an example in which each idle mode time unit comprises a number of radio frames and the communication signal is transmitted more than one in each idle mode time unit.
Figure 5:
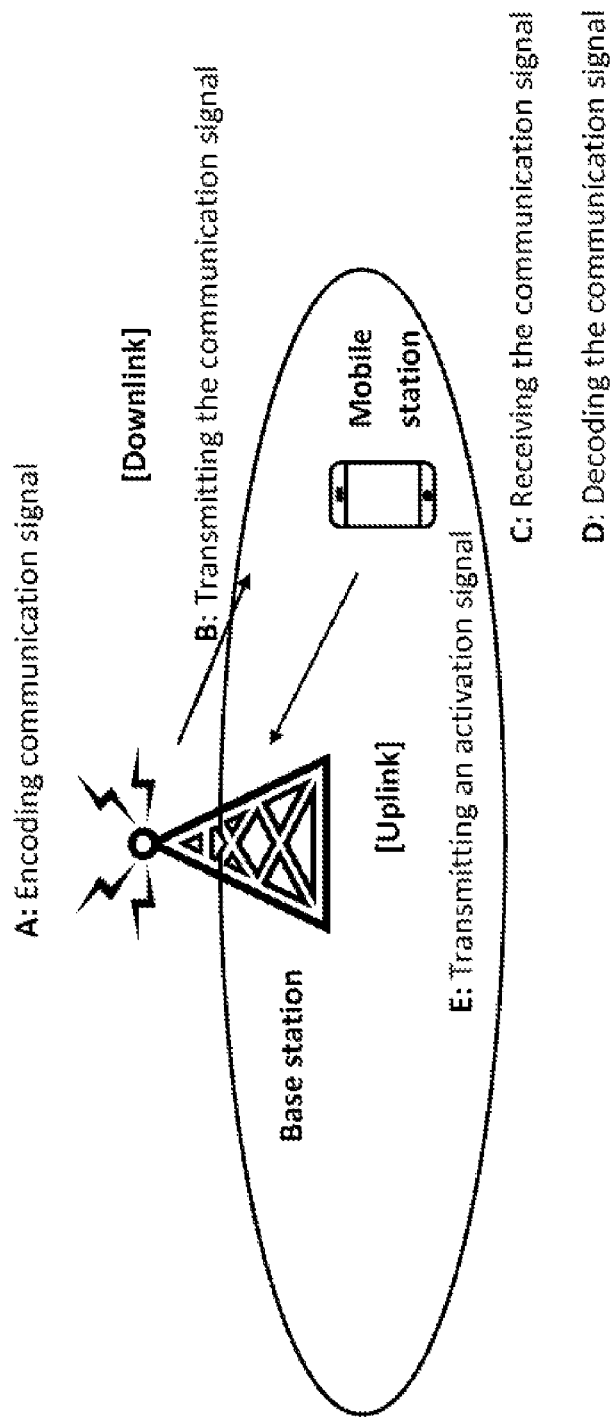
FIG. 5 illustrates a system overview of an embodiment.

It is also possible to transmit the communication signal associated with a specific idle mode time unit $t_{Idle,n}$ repeatedly, i.e. more than once, during that specific idle mode time unit $t_{Idle,n}$. The communication signal can be regularly or irregularly transmitted during the specific idle mode time unit $t_{Idle,n}$. The transmission of the communication signal within an idle mode time may comprise multiple transmissions of the same signal or a modified version thereof. For instance, when the idle mode time unit comprises several radio frame as defined in the related art LTE systems (i.e., each radio frame consisting of 20 slots of 0.5 ms length, corresponding to 10 subframes of length 1 ms each), the transmission of the first network node may comprise the transmission of the same signal in multiple slots or subframes. This is beneficial to perform RRM measurements and improve the correct detection of the idle time. FIG. 4 illustrates the transmission of the present communication signal by a first network node, operating in the idle mode, in which each idle mode time unit comprises a number of radio frames and the communication signal is transmitted more than one time in each idle mode time unit.

In another embodiment, the number of idle mode time units N in the idle mode time of at least a first network node is fixed. The value of N could be selected in order to maximize the detection probability or to achieve a target detection probability. The advantage of this is to reduce the receiver complexity. In a further embodiment, the value N is instead semi-statically configured for a first network node or a group of first network nodes. The configuration of N can then be signalled as part of the system information, as e.g., part of the downlink control information in a downlink control channel (e.g., PDCCH or EPDCCH in the related art LTE system) in cellular systems, or through higher layer signalling (e.g., via the radio resource control RRC signalling in the LTE).

In another embodiment, each communication signal transmitted in an idle mode time unit n=1, 2, . . . , N by the first network node comprises a distinct sequence. Hence, each idle mode time unit is associated with the transmission of a distinct sequence. To maximize the detection probability of the correct idle mode time unit, suitable sequences should have low cross-correlation. The set of sequences used by a network node to encode each idle mode time unit can be signalled as part of the system information or through higher layer signalling (e.g., via the radio resource control RRC signalling in the LTE) or be predefined at the second network node.

Regarding the transmission of the communication signal it has been concluded by the inventor that the communication signal may be transmitted with the use of a distinct sequence for each idle mode time unit transmission thereby differentiating the transmissions from each other. This means that each distinct sequence is associated with a corresponding idle mode time unit $t_{Idle,n}$.

Each distinct sequence is according to another embodiment a cyclic shifted version of a base sequence. Hence, each idle mode time unit is associated with a cyclic-shifted version of the given base sequence. Suitable sequences for this scope are preferably, for instance, constant-envelop zero-autocorrelation sequences, such as the Cazac sequences or the Zadoff-Chou sequences. One benefit of this is a low-complexity receiver design, which can be implemented with a bank of matched filters. By detecting the cyclic shift of a known base sequence, the receiver identifies the associated idle mode time unit.

According to yet another embodiment, each communication signal transmitted in an idle mode time unit (n=1, 2, . . . , N is a positive integer) by the first network node further comprises the transmission of the base sequence from which the cyclic shifts are determined. The base sequence and its cyclic shifted version can be transmitted in different time-frequency resources so that they are time multiplexed and/or frequency multiplexed. In one example, the two sequences (i.e., the shifted and the base sequence) are time multiplexed into two different OFDM symbols and may occupy the same subcarriers in the frequency domain. In a further example, the two sequences are frequency multiplexed, i.e., transmitted in the same OFDM symbol but on different subcarriers. Other combinations of multiplexing are clearly possible to the skilled person.

Furthermore, according to yet another embodiment, the present communication signal transmitted by the first network node is further characterized by that one or more of its properties (e.g., modulation sequence, time-frequency resource usage, code rate, etc.) are depending on the ID of the first network node. With this additional feature the signal may serve one or several purposes, such as in the case if the first network node is a cell: encoding a cell ID, being a reference signal for cell ID verification, being a reference signal for time- and frequency synchronization, being a reference signal for radio resource management (RRM) measurements (e.g., RSRP and RSRQ) and being a reference signal for radio link monitoring measurements.

In a further embodiment, the communication signal is further characterized by that one or more of its properties (e.g., modulation sequence, time-frequency resource usage, code rate, etc.) are common to at least a group of first network nodes in the wireless communication system. This is beneficial, for instance, when groups of first network nodes are clustered and their operation is coordinated, e.g., as a plurality of cooperating cells. It is further beneficial so as to simplify the signal design of the system.

Moreover, in one embodiment, the communication signal is transmitted by a first network node (the transmitter) to indicate an indefinite idle mode time duration. In one example of this embodiment the same sequence is transmitted in each idle mode time unit. As the sequence indicates an indefinite idle mode time duration $T_{Idle}$, the duration of each idle mode time unit as well as the number of idle mode time units can be arbitrary. With this additional feature of the invention a first network node does not need to plan the duration of an idle mode time duration, but can extend or adapt the idle mode time duration indefinitely.

Figure 3:
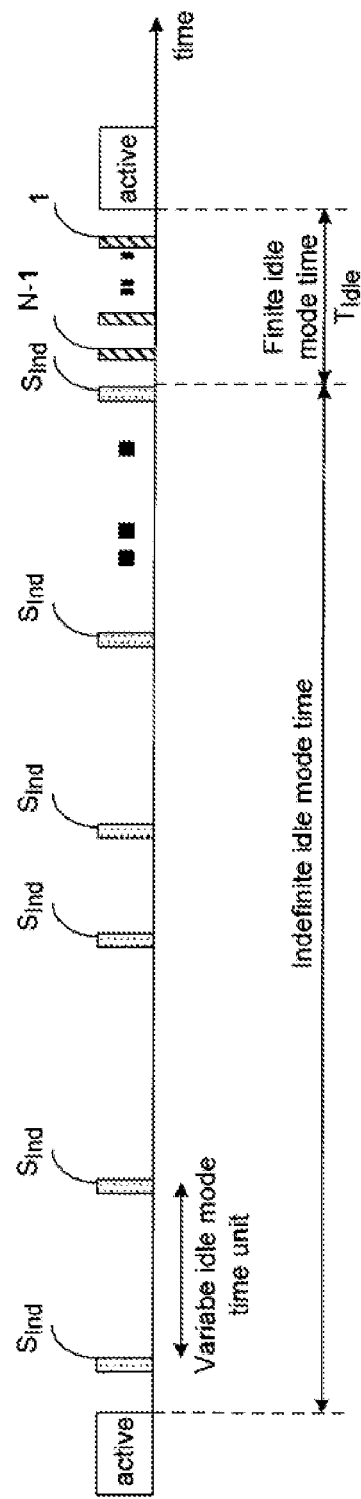
FIG. 3 illustrates the indication of an indefinite idle mode time duration followed by the indication of a finite idle mode time duration.

In particular, a first network node may transmit a signal indicating indefinite time left in the idle mode for the first network node followed by another signal indicating a finite idle time according to previous embodiments described above, which is illustrated in FIG. 3 where $s_{Ind}$ denotes a signal sequence associated with an indefinite time left. The switch from an indefinite idle time to a finite idle time may be implicitly determined by the second network node (the receiver) by detecting a different signal sequence without any additional signalling which can be achieved by using a distinct sequence associated with the indication of indefinite time left in the idle mode. In a preferred embodiment, the distinct sequence associated with the indication of an indefinite time left in idle mode should have low cross-correlation with any sequence associated with the indication of a finite time left in idle mode. In one example, sequences of different type can be used for the two cases, and in another example, different base sequences of the same kind (e.g., Cazac sequences or Zadoff-Chou sequences) are be associated with the transmission of indefinite and finite time left in idle mode, respectively. Combined with at least a previous embodiment, the signal can be further characterized by that one or more of its properties (e.g., modulation sequence, code rate, time-frequency resources, etc.) are depending on the ID of the first network node. One usage of the signal with this additional feature is that the signal can be a reference signal for Radio Resource Management (RRM) measurements (e.g., RSRP and RSRQ).

A second network node that receives the communication signal from a first network node indicating an indefinite idle time can thereby utilize the communication signal as a reference signal for Radio Resource Management (RRM) measurements (e.g., RSRP and RSRQ). If the signal quality fulfils certain parameters or requirements, the second network node can determine to transmit a response signal to trigger the activation of the first network node in a finite time. In one example, the second network node determines to transmit an activation signal to a first network if the signal quality measured for a communication signal transmitted by said first network node indicating the time left in idle mode exceeds a signal quality threshold value. The threshold value can be specified by a standard or be configured. For example, when the second network node is a mobile station in a radio cellular system connected to a serving base station and the first network node is a base station in idle mode, the threshold value can be the signal quality measured for the serving base station. Therefore, the first network node is requested to be activated if the communication link to the second network node is better than an existing link from the second network node and a third network node, etc.

In another embodiment, upon receiving an activation signal transmitted by a second network node, the first network node can determine or be configured (e.g., by a network control node such as an eNodeB in LTE) to operate in the active mode after a predetermined period of time. In one example, a first network node determined to operate in the active mode after a predetermined period of time switches between transmitting a signal indicating indefinite idle time to transmitting a signal indicating a finite idle mode time for the remaining idle mode time. In another example, upon receiving the activation signal, the first network node determined to operate in the active mode after a predetermined time does not transmit any further signal indicating an idle mode time.

According to yet another embodiment, each communication signal transmitted in an idle time mode time further comprises the transmission of at least one synchronization signals, such as e.g., PSS and SSS in the LTE system. In one example, the signal is transmitted on the same antenna port as the synchronization signals in the case that the first network node supports transmission on different antenna ports. The advantage of transmitting synchronization signals with the communication signal is to enable the receiver to synchronize to the transmitter during the idle mode time of the transmitter. Thereby, handover procedure can be speeded up when the first network node transits to the active mode or the connection to the first network node if the second network node was not prior connected to any other cell in the system. A further advantage with this embodiment is to reduce the inter-cell interference on synchronization signals of active cells as the transmission occurs more sporadically if the first network node is represented as a cell.

Additionally, the communication signal may be transmitted in predefined time-frequency radio resources in TDD and/or FDD carriers located in the middle of the TDD and FDD carrier bandwidth. And in one example of the invention the predefined radio resources correspond to at least one resource block of available frequency resources in the smallest bandwidth of the system. This has the advantage of making the signal design invariant with respect to the system bandwidth. In the related art LTE system, this may correspond to a set of time-frequency radio resources within the six central physical resource blocks of a downlink frequency carrier.

In another example, the communication signal transmitted in an idle mode time unit is mapped to time-frequency resources of existing synchronization signals. The difference with legacy synchronization signals, though, is in that the signal is transmitted more sparsely in time. This enables to orthogonally time multiplex the signal of multiple idle cells in a limited geographical area, thereby reducing the inter-cell interference among signals.

In yet another example, the communication signal is transmitted in time-frequency resources of existing reference signals. For the related art LTE system, for instance, suitable reference signal patterns are the time-frequency resources used for common reference signals (CRS), demodulation reference signals (DMRS), channel state information reference signals (CSI-RS), positioning reference signals (PRS), sounding reference signals (SRS). According to a previous embodiment, for instance, a base sequence and a cyclic shifted version of the base sequence may be transmitted over different time-frequency patterns associated to reference signals. In the related-art LTE system, different time-frequency patterns of a reference signal may be associated to different antenna ports. In a further embodiment, the time-frequency pattern used for the transmission of the signal may further implicitly relate to the idle mode time unit indicated by the signal.

In yet another embodiment at least one communication signal transmitted by the network node further indicates the duration of the idle mode time unit. The duration of the idle mode time unit may be explicitly or implicitly signalled. This has the benefit of helping the second network node to determine the time left prior the reactivation of the cell. The second network node determines the idle mode time unit $t_{Idle}$, by measuring the time between at least two consecutive of the signal. For a more accurate estimate of the idle mode time unit, a second network node may average measurements over more than two or more idle mode time units. The advantage of this method is to reduce the signalling overhead required to determine the reactivation time of a first network node in the idle mode.

In another embodiment at least one communication signal transmitted by the network node further indicates the duration of the active mode time duration of the first network node. Combined with other suitable parameters, such as signal strength measurements, the duration of the idle mode time left, the type of service required by the second network node, etc., this additional information enables the second network node to determine whether it should or should not consider a certain first network node as suitable for communication, thereby waiting for its reactivation.

From the above disclosure it is clear that according to yet another embodiment the wireless communication system may be a cellular system, and preferably a 3GPP system such as LTE. In this specific embodiment the communication signal is transmitted in the downlink of the cellular communication system and the first network node is e.g. a base station, relay node, access point, etc. This also implies that the second network node is a mobile station, such as a UE. FIG. 4 shows a system overview of transmissions between a base station (cell) and a mobile station according to an embodiment in which includes the following steps. In step A, the base station (the first network node) encodes an indication of time left in idle mode for the base station into a communication signal. In step B, the base station transmits the communication signal in the downlink. In step C, the mobile station (the second network node) receives the communication signal from the base station. In step D, the mobile station decodes the communication signal and obtains the indication of time left in idle mode for the base station. In step E, the mobile station wants to activate the base station in idle mode and therefore transmits an activation signal in the uplink to the base station which is activated into active mode after a predetermined period of time.

It should however be noted that the embodiments may also applicable in a system in which the first and second network nodes are nodes of the same kind or peer-nodes and communicate with one other. One example is the case of cellular networks in which mobile stations are adapted to directly communicate with each other, and hence both the first and second network nodes are mobile stations in such a case. Another example is a communication system in which the first and second network nodes are wireless sensor nodes or any machine type with radio communication capabilities. Device-to-device communication and machine type communication are examples of such systems in the related art LTE system.

Furthermore, as understood by the person skilled in the art, any method according to the embodiments may also be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

The embodiments further relate to first and second network node devices directly corresponding to the methods in the first and second network nodes. It is realised by the skilled person that the first and second network node devices comprises the necessary communication capabilities in the form of e.g., functions, means, units, elements, etc. for executing the methods according to the invention which means that the devices can be modified, mutatis mutandis, according to any method of the present invention. Examples of such means, units, elements and functions are: receivers, transmitters, processors, encoders, decoders, mapping units, multipliers, interleavers, deinterleavers, modulators, demodulators, inputs, outputs, antennas, amplifiers, DSPs, etc which are suitable arranged together. Further, examples of first and second network node device are base stations, relay nodes, mobile stations, pico nodes, micro nodes, remote radio heads, network access points, etc.

Especially, the processors of the first and the second network devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the embodiments described above, but also relates to and incorporates all embodiments within the scope of the appended independent claims.

What is claimed is:

1. A method, comprising:
   determining N idle mode time units $t_{Idle,n}$, wherein an idle mode time duration for a first network node is divided into the N number of idle mode time units $t_{Idle,n}$, wherein n=2, . . . , N is a positive integer greater than 1, and each of the idle mode time units $t_{Idle,n}$ has an equal duration;
   in each of the N idle mode time units $t_{Idle,n}$, encoding an indication of time left in idle mode for the first network node into a communication signal, wherein the first network node is in the idle mode during the encoding; and
   in each of the N idle mode time units $t_{Idle,n}$, transmitting the communication signal in a wireless communication system while the first network node is operating in the idle mode;
   wherein the first network node is arranged to operate in an active mode in which the first network node has one or both of full transmission capability and full reception capability; or
   wherein the first network node is arranged to operate in the idle mode in which the first network node has one or both of limited transmission capability and reception capability in relation to the active mode.

2. The method according to claim 1, wherein the communication signal comprises an indication of the number of idle mode time units $t_{Idle,n}$ left in the idle mode.

3. The method according to claim 1, wherein the communication signal is transmitted by one of N distinct sequences, each distinct sequence being associated with a corresponding idle mode time unit $t_{Idle,n}$.

4. The method according to claim 3, wherein the N distinct sequences are generated from a cyclically shifted base sequence having different cyclic shifted sequences.

5. The method according to claim 1, wherein the communication signal is transmitted a plurality of times in each idle mode time unit $t_{Idle,n}$.

6. The method according to claim 1, wherein the communication signal further comprises an indication of the duration of each idle mode time unit $t_{Idle,n}$.

7. The method according to claim 1, wherein the number of idle mode time units N is fixed and predetermined.

8. The method according to claim 1, wherein the number of idle mode time units N is semi-statically configured and signalled.

9. The method according to claim 1, wherein the communication signal is transmitted over same time-frequency resources in each idle mode time unit $t_{Idle,n}$.

10. The method according to claim 1, wherein the communication signal is transmitted over different time-frequency resources in each idle mode time unit $t_{Idle,n}$.

11. The method according to claim 1, wherein each respective communication signal comprises an indication of indefinite time left in the idle mode for the first network node.

12. The method according to claim 1, wherein each respective communication signal further comprises an indication of an active mode time duration of the first network node.

13. The method according to claim 1, further comprising:
receiving one of the communication signals transmitted from the first network node; and
decoding the received communication signal to obtain the indication of time left the idle mode for the first network node.

14. The method according to claim 13, further comprising:
transmitting an activation signal to the first network node in response to the received communication signal comprising an indication of indefinite time, the activation signal triggering the first network node to operate in the active mode after a predetermined time.

15. The method according to claim 13, further comprising:
measuring a signal quality of the received communication signal;
comparing the signal quality with a signal quality threshold; and
transmitting an activation signal to the first network node if the received communication signal comprises an indication of indefinite time and the signal quality is no less than the signal quality threshold, the activation signal triggering the first network node to operate in the active mode after a predetermined time.

16. A first network node device, comprising:
a processor; and
a non-transitory computer-readable storage medium storing a program to be executed by the processor, the program including instructions for:
determining N idle mode time units $t_{Idle,n}$, wherein an idle mode time duration for the first network node device is divided into the N number of idle mode time units $t_{Idle,n}$, wherein n=2, ..., N is a positive integer greater than 1, and each of the idle mode time units $t_{Idle,n}$ has equal duration;
in each of the N idle mode time units $t_{Idle,n}$, encoding an indication of time left in idle mode for the first network node device into a communication signal, wherein the first network node device is in the idle mode during the encoding; and
a transmitter arranged for transmitting the communication signal in a wireless communication system while operating in the idle mode;
wherein the first network node device is arranged to operate in an active mode in which the first network node device has one or more of full transmission capability and full reception capability; or
wherein the first network node device is arranged to operate in the idle mode in which the first network node device has one or more of limited transmission capability and reception capability in relation to the active mode.

17. A second network node device, comprising:
a receiver arranged to receive a communication signal transmitted by a first network node device; and
a decoder arranged for decoding the communication signal to obtain an indication of time left in an idle mode for the first network node device;
wherein the first network node device is configured to:
determine N idle mode time units $t_{Idle,n}$, wherein an idle mode time duration for the first network node device is divided into the N number of idle mode time units $t_{Idle,n}$, wherein n=2, ..., N is a positive integer greater than 1, and each of the idle mode time units $t_{Idle,n}$ has equal duration;
in each of the N idle mode time units $t_{Idle,n}$, encode an indication of time left in the idle mode for the first network node device into the communication signal, wherein the first network node device is in the idle mode during the encoding; and
transmit the communication signal in a wireless communication system while operating in the idle mode;
wherein the first network node device is configured to operate in an active mode in which the first network node device has one or more of full transmission capability and full reception capability; or
wherein the first network node device is configured to operate in the idle mode in which the first network node device has one or more of limited transmission capability and reception capability in relation to the active mode.

18. The first network node device according to claim 16, wherein the communication signal comprises an indication of the number of idle mode time units $t_{Idle,n}$ left in the idle mode.

19. The second network node device according to claim 17, wherein the communication signal comprises an indication of the number of idle mode time units $t_{Idle,n}$ left in the idle mode.

* * * * *